United States Patent [19]

Heger

[11] 4,454,277

[45] Jun. 12, 1984

[54] PREPARATIONS OF STORAGE-STABLE AQUEOUS SOLUTIONS OF MELAMINE-FORMALDEHYDE RESINS

[75] Inventor: Friedl Heger, Linz, Austria

[73] Assignee: Chemie Linz Aktiengesellschaft, Linz, Austria

[21] Appl. No.: 365,126

[22] Filed: Apr. 5, 1982

Related U.S. Application Data

[63] Continuation-in-part of Ser. No. 294,094, Aug. 19, 1981, abandoned.

[30] Foreign Application Priority Data

Dec. 22, 1980 [DE] Fed. Rep. of Germany ....... 3048448

[51] Int. Cl.³ .............................................. C08K 5/21
[52] U.S. Cl. .................................... 524/211; 524/767
[58] Field of Search ................ 524/843, 767, 211, 767

[56] References Cited

U.S. PATENT DOCUMENTS

| | | | |
|---|---|---|---|
| 2,640,041 | 5/1953 | Bruner et al. | 524/843 |
| 2,697,086 | 12/1954 | Lindenfelser et al. | 524/767 |
| 2,839,484 | 6/1958 | Renner | 524/843 |
| 3,159,593 | 12/1964 | Morini et al. | 524/843 |

FOREIGN PATENT DOCUMENTS

| | | |
|---|---|---|
| 526114 | 6/1956 | Canada ............................. 524/211 |
| 1570240 | 2/1965 | Fed. Rep. of Germany . |
| 691053 | 5/1953 | United Kingdom . |

*Primary Examiner*—Joseph L. Schofer
*Assistant Examiner*—N. Sarofim
*Attorney, Agent, or Firm*—Mark Dryer

[57] ABSTRACT

An improved process for substantially increasing the shelf-life of aqueous solutions of melamine-formaldehyde resins wherein the molar ratio of melamine to formaldehyde is from 1:1.7 to 1:3.5 by the addition of a stabilizing amount of urea after condensation, which process includes the steps of adjusting pH of the resin solution before and after the dissolution of the urea within certain narrow but easily controllable pH ranges. The properties of the resin solution can be further improved and the stabilizing effect of the addition of urea increased by adding a monohydric $C_1$–$C_4$ alkanol during condensation of the resin.

7 Claims, No Drawings

PREPARATIONS OF STORAGE-STABLE AQUEOUS SOLUTIONS OF MELAMINE-FORMALDEHYDE RESINS

This is a continuation-in-part application of Patent Application Ser. No. 294,094 filed on Aug. 19, 1981, now abandoned.

This invention relates to a process for the preparation of storage-stable aqueous solutions of melamine-formaldehyde resins. More particularly, the invention is concerned with the preparation of storage-stable aqueous solutions having a molar ratio of water-soluble melamine-formaldehyde resins typical, for example, for impregnating resins and adhesive resins, namely 1:1.7 to 1:3.5. The desired stability is produced by the addition of urea, which increases the shelf-life from some days to several weeks, whereby most favourable results can be obtained, if the condensation of the resin is performed in the presence of a $C_1$–$C_4$ alcohol.

Hitherto, the only known process which employs urea or thiourea as a stabilizer for aminoplast resins is that disclosed in German Auslegeschrift No. 1,570,240. This process is characterized in that aqueous solutions of impregnating resins, which contain, side by side, condensation products of formaldehyde and aminoplast-forming compounds having limited solubility in water, and the first reaction products of formaldehyde and aminoplast-forming compounds, the weight ratio of these two components being 1:3 to 3:1, are heated to 50° to 60° C. at a pH value of 7.0 to 8.5 and, if appropriate, 5 to 15% by weight, based on solids, of urea and/or thiourea are added to the solution.

Surprisingly, it has now been found that the shelf life of aqueous solutions of malamine-formaldehyde resins wherein the molar ratio of melamine:formaldehyde is from 1:1.7 to 1:3.5, is substantially increased by the simple addition of urea if, before and after the dissolution of the urea in the resin solution or in the aqueous mixture of the two starting materials, certain narrow but easily controllable pH ranges are established.

Accordingly it is not necessary, as was the case with the quoted prior art, first to prepare two resin solutions of different degrees of condensation, then to mix them in a certain ratio, additionally to adjust the pH to a certain range, and only then to add the urea component in an amount of 5 to 15% by weight, based on solids content.

Accordingly, the present invention provides in a process for the preparation of a storage-stable aqueous solution of a melamine-formaldehyde resin by the addition of urea after condensation has taken place, the improvement which comprises the steps of adjusting the pH of an aqueous mixture of melamine and formaldehyde, wherein the molar ratio of melamine to formaldehyde is within the range of 1:1.7 to 1:3.5, at room temperature, to a value of from 8.5 to 9.5, condensing the mixture at a temperature of from about 90° C. to the reflux temperature until the desired degree of condensation is reached, thereafter cooling the resulting resin solution to a temperature within the range of 25° to 50° C., adjusting the pH thereof to a value of from 7 to 9.6 and adding urea in an amount of 1 to 10% by weight, relative to the liquid resin having a solids content of 50 to 65% by weight, following which the pH of the resin solution is adjusted to a value of from 9.2 to 11.5.

The pH adjustments required in accordance with the invention may be achieved by conventional means known in the art, for example, by the addition of an alkali solution.

The aqueous mixtures obtained on dissolving melamine in formaldehyde have pH values of from 4 to 7 at room temperature. According to the invention, the pH is adjusted to a value from 8.5 to 9.5. This measure, again, is essential in order to achieve the effect according to the invention, and is preferably achieved by adding a suitable amount of an alkali solution, such as aqueous sodium hydroxide solution. The subsequent preparation of the resin may be taken to any degree of condensation customary for impregnating resins, and the details of the preparation depend, as usual, on the intended end use. Advantageously, the condensation is taken to a degree which corresponds to a water compatibility of from 3.0 to 5.0. (The water compatibility is the volume of water, originally at 20° C., which on mixing with 1 part by volume of resin solution, taken from the resin batch before it has cooled, exhibits an incipient turbidity).

After completion of the condensation reaction, the reaction mixture is cooled to a temperature within the range of 25° to 50° C. and at this temperature urea is added according to the invention, in an amount of 1 to 10% by weight, and preferably, 2 to 6% by weight, relative to the liquid resin having a solids content of 50 to 65% by weight. In order to intensify the stabilizing action of the urea, the pH of the resin solution, before addition of the urea, must be adjusted to a value of 7 to 9.6 by addition of a weak acid or an alkaline solution depending on the pH of the mixture after condensation and the desired pH within the range between 7 and 9.6. After the urea has dissolved in the resin, a further improvement in shelf-life is achieved by adjusting the final or storage pH to a value of 9.2 to 11.5, preferably 10 to 11.

As regards the pH value settings according to the invention, it is to be noted that whilst they partially overlap they in fact concern different systems in all three cases. The first setting is made in the uncondensed melamine-formaldehyde solution; the second in the resin which has been prepared therefrom, brought to the desired degree of condensation and cooled to a temperature of 25° to 50° C., before addition of urea or dissolution of urea in this resin; and the third after dissolution of the urea, at room temperature.

The addition of urea at best leads to a slight increase in the pH value, but a further increase to the range according to the invention, namely 9.2 to 11.5, preferably 10 to 11, is always necessary. This increase is preferably achieved with aqueous sodium hydroxide solution.

The solutions, thus prepared, of melamine-formaldehyde condensation products as a rule have a solids content of 50 to 65% by weight and a shelf-life of from about 4 to 10 weeks, depending on the conditions used within the scope of the invention. During storage a slight increase of viscosity is to be noticed, and sometimes a slight turbidity occurs, which both have practically no influence on processability.

According to a preferred embodiment of the invention resins with more improved properties can be obtained by adding during the condensation step an aliphatic monohydric alcohol with 1 to 4 carbon atoms. This addition has to be performed after adjusting the pH to the value of 8.5 to 9.5 according to the invention. The viscosity of resins such produced practically does not rise (per example only 2–5 sec, determined according to DIN 53211, 4 mm) and the solutions remain clear for a longer period of time during storage. Therefore these resins are outstandingly suitable for impregnating and dipping purposes. Further in most of the cases, the shelf life time can be further increased over that shelf life time, obtained by adding urea only.

Alkanols which are suitable are for example methanol, ethanol, n-propanol, n-butanol and isobutanol, whereby ethanol, n-propanol and n-butanol are preferred.

For carrying out the process of the present invention with using alcohols in the condensation step it is suitable, to heat the reaction mixture after having adjusted the pH to the desired condensation temperature and to add the alcohol slowly, while maintaining the condensation temperature. Afterwards the condensation is performed until the desired degree of condensation is reached.

The amount of alcohol used depends somewhat on the formaldehyde-melamine ratio of the resin so produced and the nature of the alcohol used. Usually the amount lies within the range of 3 and 10% per weight, relative to the reaction mixture and preferably within the range of 3 to 8% by weight.

Because of their good impregnating capacity and processability, which persist up to the limit of the shelf-life, the aqueous solutions according to the invention are outstandingly suitable for the conventional end uses, such as coating of chipboard, fiberboard and laminates with impregnated decorative papers and then processing under pressure so as the produce decorative surfaces.

However, the process according to the invention is not restricted to the preparation of such resin solutions for impregnating purposes but is also suitable for stabilizing aqueous solutions of other melamine-formaldehyde resins, having a somewhat higher degree of condensation, for example, adhesive resins.

The following Examples illustrate the process according to the invention in more detail. In each of the Examples the pH measurements are conducted with a glass electrode.

EXAMPLE 1

3,680.5 g of aqueous 36.7% strength formaldehyde solution, 819.5 g of water and 3,153.3 g of melamine corresponding to a formaldehyde-melamine ratio of 1.8 are introduced into a glass or stainless steel stirred vessel and the resulting mixture is adjusted to a pH value of 9.2 with 0.1 N sodium hydroxide aqueous solution. The mixture is heated to the reflux temperature in the course of about 50 minutes and is condensed, at this temperature, up to a water compatibility of 4.0.

The batch is then cooled to 40° C. in the course of about one hour. The pH value of the resin is adjusted to 8.8 with 25 percent formic acid and 229.5 g of urea (3% by weight, relative to the liquid resin) is then added. After the urea has dissolved, the final pH value of the resin is adjusted to 10.1 with 0.1 N sodium hydroxide solution at 25° C.

The shelf-life of the resulting resin solution is about 8 weeks.

EXAMPLE 2

The procedure described in Example 1 was followed, but the final pH value of the resin was adjusted to 9.4 with 0.1 N sodium hydroxide solution at 20° to 25° C.
Shelf-life: about 6 weeks.

EXAMPLE 3

The procedure described in Example 1 was followed, but the final pH value of the resin was adjusted to 11.0 with 0.1 N sodium hydroxide solution at 20° to 25° C.
Shelf-life: about 10 weeks.

EXAMPLE 4

994.48 g of 36.2% strength formaldehyde solution, 205.5 g of water and 504 g of melamine corresponding to a formaldehyde-melamine ratio of 3.0 are introduced into a glass or stainless steel stirred vessel. The resulting mixture is adjusted to a pH value of 9.2 with 0.1 N sodium hydroxide solution and is heated to the reflux temperature in the course of about 30 minutes. At this temperature, it is condensed to a water compatibility of 3.5 to 4.0. The resin solution is then cooled to 40° C. and the pH value is adjusted to 8.8 with 25 percent formic acid. 51.12 g of urea (3%, relative to liquid resin) is then added and when the urea has dissolved the pH value is adjusted to 10.1 with 0.1 N sodium hydroxide solution at 20° to 25° C.
Shelf-life: about 8 weeks.

EXAMPLE 5

The procedure as described in Example 1 is followed, except that 10% of urea is added.
Shelf-life: about 4 weeks.

EXAMPLE 6

The procedure as described in Example 1 is followed, except that 1.5% of urea is added.
Shelf-life: about 4 weeks.

EXAMPLE 7

437.85 g of 36% strength formaldehyde solution, 102.15 g of water and 378.79 g of melamine corresponding to a formaldehyde-melamine ratio of 1.8 are introduced into a glass or stainless steel stirred vessel and the mixture is adjusted to a pH value of 8.7 with 0.1 N sodium hydroxide solution. The mixture is heated to 98° C. in the course of about 30 minutes and is condensed, at this temperature, to a water compatibility of 4.6. The batch is then cooled to 40° C. in the course of about one hour and at this temperature the pH value of the resin is adjusted to 9.6 with 0.1 N sodium hydroxide solution. 27.56 g of urea (3%, relative to liquid resin) is then added. When the urea has dissolved, the final pH value of the resin is adjusted to 10.0 with 0.1 N sodium hydroxide solution at about 25° C.
Shelf-life: about 5 weeks.

EXAMPLE 8

The procedure described in Example 1 was followed, except that the pH value of the resin was adjusted to 7.0 before the addition of urea.
Shelf-life: about 8 weeks.

EXAMPLE 9

353.2 g of 36.1% strength formaldehyde solution, 71.8 g of water and 315 g of melamine, corresponding to a formaldehyde melamine ratio of 1.7 are introduced into a glass or stainless steel stirred vessel and the resulting mixture is adjusted to a pH value of 9.2. The mixture is heated to the reflux temperature in the course of about 30 minutes, and then 35.8 g of n-butanol (4.8% per weight relative to the reaction mixture) is added in small portions. The mixture is heated to the reflux temperature up to a water compatibility of 4.0.

The batch is then cooled to 40° C. in the course of about one hour. The pH value of the resin is adjusted to 8.8 as described in Example 1 and 22.24 g of urea (3% per weight, relative to the liquid resin) is then added. After the urea has dissolved the final pH value of the resin is adjusted to 10.1.

The shelf-life of the resulting resin solution is about 13 weeks.

EXAMPLE 10

332.4 g of 36% strength formaldehyde solution, 67.6 g of water and 252 g of melamine corresponding to a formaldehyde-melamine ratio of 2:1 are heated to reflux temperature in the course of 30 minutes after having been adjusted to a pH of 9.0. 32.6 g of n-butanol (5% per weight relative to the reaction mixture) is added and the condensation is performed as described in Example 9. After cooling to 40° C. and adjusting the pH value to 8.3 20.53 g of urea (3% per weight) is added. The final pH value is then adjusted to 11.0.

The shelf-life of the solution is about 15 weeks.

EXAMPLE 11

423.8 g of aqueous 36,1% strength formaldehyde solution, 86.2 g of water and 214.2 g of melamine corresponding to a formaldehyde-melamine ratio of 3:1 are processed as described in example 9, whereby 36.2 g of n-butanol (5% by weight relative to the reaction mixture) is added at reflux temperature. After condensation is completed, and pH is adjusted to 8.8, 22.81 g of urea (5% per weight) is then added and the final pH value is adjusted to 10.1.

The shelf-life of the solution is about 23 weeks.

If the procedure of this example is followed but with the same amount of alcohols listed thereafter, the following results are obtained:

| alcohol | % by weight | shelf life time |
| --- | --- | --- |
| ethanol | 5% | 7 weeks |
| methanol | 5% | 4 weeks |
| n-propanol | 5% | 14 weeks |

EXAMPLE 12

To a reaction mixture for producing a resin of a formaldehyde melamine ratio of 2.0:1 prepared according example 10 and processed according to example 9 13.04 g of n-butanol (2% per weight) is added.

The shelf life of the clear solution is about 6 weeks.

The following results were obtained by following the same procedure but with varying amounts of n-butanol:

| n-butanol in percent by weight | shelf-life time |
| --- | --- |
| 3% | 8 weeks |
| 7% | 10 weeks |
| 10% | 10 weeks |

EXAMPLE 13

400 g of 30% strength formaldehyde solution ans 252 g of melamine are added in a vessel as described in example 9. The formaldehyde-melamine ratio of the resin is 2.0:1. The pH-value is adjusted to 9.0 and the resulting mixture is heated to reflux temperature in the course of 30 minutes and then 32.6 g of pure ethanol 15% by weight is added slowly. Condensation is completed up to a water compatibility of 4.0 and the mixture is cooled to 40° C. in the course of 1 hour. After adjusting the pH-value to 8.8, 20.53 g of urea (3% by weight) is added. The final pH-value used is 11.0.

The shelf life of the resin solution is about 13 weeks.

If the procedure of this example is followed but with the same amount of alcohols listed thereafter, the following results are obtained:

| alcohol | % by weight | shelf life time |
| --- | --- | --- |
| ethanol | 3% | 5 weeks |
| ethanol | 7% | 17 weeks |
| ethanol | 10% | 15 weeks |
| methanol | 3% | 4 weeks |
| methanol | 5% | 11 weeks |
| methanol | 7% | 18 weeks |
| methanol | 10% | 20 weeks |
| n-propanol | 3% | 12 weeks |
| n-propanol | 5% | 14 weeks |
| n-propanol | 7% | 17 weeks |
| n-propanol | 10% | 17 weeks |
| isobutanol | 5% | 14 weeks |

EXAMPLE 14

280.98 g of 36.3% strength formaldehyde solution, 59.02 g of water and 252 g of melamine corresponding to a formaldehyde-melamine ratio of 1.7 are introduced into a glass or stainless steel stirred vessel and the mixture is adjusted to a pH-value of 9.0. The mixture is heated to the reflux temperature in the course of about 30 minutes, and then 29.6 g of ethanol (5% per weight relative to the reaction mixture) is added in small portions. At reflux temperature the mixture is condensed to a water compatibility of 4.0. The batch is then cooled to 40° C. in the course of about one hour and at this temperature the pH of the resin is adjusted to 8.8 with 25 percent formic acid. 18.65 g of urea (3%, relative to liquid resin) is then added. When the urea has dissolved, the final pH value of the resin is adjusted to 11.0 with 0.1 N sodium hydroxide solution.

The shelf-life of the solution is about 16 weeks.

If the procedure of this example is followed but with the same amount of alcohols listed thereafter, the following results are obtained:

| alcohol | % by weight | shelf life time |
| --- | --- | --- |
| methanol | 5% | 16 weeks |
| n-propanol | 5% | 11 weeks |

What I claim is:

1. In a process for the preparation of a storage-stable aqueous solution of a melamine-formaldehyde resin by the addition of urea after condensation has taken place, the improvement which comprises the steps of adjusting the pH of an aqueous mixture of melamine and formaldehyde wherein the molar ratio of melamine to formaldehyde is within the range of 1:1.7 to 1:3.5, at room temperature, to a value of from 8.5 to 9.5, condensing the mixture at a temperature of from about 90° C. to the reflux temperature until a degree of condensation is reached which corresponds to a water compatibility of from 3.0 to 5.0, thereafter cooling the resulting resin solution to a temperature within the range of 25° to 50° C., adjusting the pH thereof to a value of from 7 to 9.6 and adding urea in an amount of 1 to 10% by weight, relative to the liquid resin having a solids content of 50 to 60% by weight, following which the pH of the resin solution is adjusted to a value of from 9.2 to 11.5.

2. A process according to claim 1, in which the urea is added in an amount from 2 and 6% by weight.

3. A process according to claim 1, in which, after the addition of urea to the resin solution, the pH of the solution is adjusted to a range of from 10 to 11.0.

4. A process according to claim 1, in which the condensation step is made in the presence of a monohydric aliphatic alcohol with 1 to 4 carbon atoms.

5. A process according to claim 4, in which the aqueous mixture of melamine and formaldehyde with a pH value of 8.5 to 9.5 is heated to the condensation temperature, the alcohol is then added slowly and the condensation is finalized until the desired degree of condensation is reached.

6. A process according to claim 4, in which the alcohol is added in an amount of 3 to 8% per weight relative to the reaction mixture.

7. A process according to claim 4, in which the alcohol is ethanol, n-propanol or n-butanol.

* * * * *